United States Patent
Reul et al.

(10) Patent No.: US 10,286,473 B2
(45) Date of Patent: May 14, 2019

(54) METHOD FOR PRODUCING A DISK WITH AN ELECTRICALLY CONDUCTIVE COATING AND A METAL STRIP WHICH IS SOLDERED ONTO THE DISK; AND CORRESPONDING DISK

(71) Applicant: SAINT-GOBAIN GLASS FRANCE, Courbevoie (FR)

(72) Inventors: Bernhard Reul, Herzogenrath (DE); Francois Hermange, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 67 days.

(21) Appl. No.: 15/506,128

(22) PCT Filed: Aug. 19, 2015

(86) PCT No.: PCT/EP2015/068998
§ 371 (c)(1),
(2) Date: Feb. 23, 2017

(87) PCT Pub. No.: WO2016/055208
PCT Pub. Date: Apr. 14, 2016

(65) Prior Publication Data
US 2017/0274464 A1 Sep. 28, 2017

(30) Foreign Application Priority Data
Oct. 7, 2014 (EP) ..................................... 14187874

(51) Int. Cl.
*B23K 1/00* (2006.01)
*B32B 17/00* (2006.01)
(Continued)

(52) U.S. Cl.
CPC .............. *B23K 1/06* (2013.01); *B23K 1/0016* (2013.01); *B32B 17/061* (2013.01); *H05B 3/06* (2013.01);
(Continued)

(58) Field of Classification Search
None
See application file for complete search history.

(56) References Cited

U.S. PATENT DOCUMENTS

| 4,023,008 A | * | 5/1977 | Durussel | .................. | H05B 3/84 |
| | | | | | 219/203 |
| 5,299,726 A | * | 4/1994 | Sauer | ...................... | B23K 1/06 |
| | | | | | 228/111.5 |

(Continued)

FOREIGN PATENT DOCUMENTS

| DE | 4032192 A1 | 6/1991 |
| DE | 4432402 A1 | 3/1996 |

(Continued)

OTHER PUBLICATIONS

International Search Report for PCT/EP2015/071452. dated Feb. 12, 2015. 6 pages.

(Continued)

*Primary Examiner* — Devang R Patel
(74) *Attorney, Agent, or Firm* — Steinfl + Bruno LLP

(57) ABSTRACT

A method for producing a pane with an electrically conductive coating and a metallic strip soldered thereon is described. The method includes providing a substrate with an electrically conductive coating, providing a metallic strip with at least one through-hole, positioning the metallic strip on the electrically conductive coating, wherein the hole is arranged on the electrically conductive coating, and soldering the metallic strip to the electrically conductive coating via a soldering compound using an ultrasonic soldering tip.

13 Claims, 4 Drawing Sheets

Figure 1:
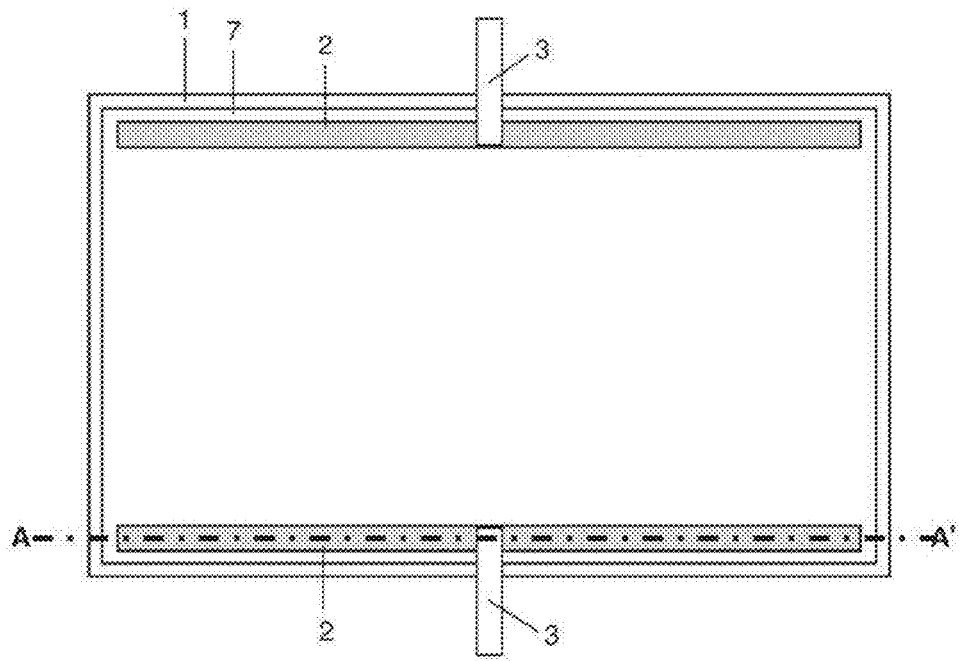

(51) Int. Cl.
*H05B 3/06* (2006.01)
*B23K 1/06* (2006.01)
*H05B 3/84* (2006.01)
*B32B 17/06* (2006.01)
*B23K 101/36* (2006.01)

(52) U.S. Cl.
CPC ............ *H05B 3/84* (2013.01); *B23K 2101/36* (2018.08); *B32B 2307/202* (2013.01); *H05B 2203/011* (2013.01); *H05B 2203/013* (2013.01); *H05B 2203/017* (2013.01)

(56) References Cited

U.S. PATENT DOCUMENTS

| | | | |
|---|---|---|---|
| 5,762,257 | A | 6/1998 | Garrecht |
| 9,260,906 | B2 | 2/2016 | Schreiber |
| 9,484,651 | B2* | 11/2016 | Rateiczak ............. B23K 35/26 |
| 9,496,632 | B2* | 11/2016 | Schmalbuch .......... H01R 12/57 |
| 9,509,088 | B2* | 11/2016 | Timmermann .... H01R 12/7041 |
| 2005/0045700 | A1* | 3/2005 | Winter .................. B23K 35/02 228/246 |
| 2005/0217718 | A1 | 10/2005 | Dings et al. |
| 2012/0132251 | A1 | 5/2012 | Sedlacek et al. |
| 2013/0140347 | A1* | 6/2013 | Friedl .................... C03C 27/08 228/111.5 |
| 2013/0224990 | A1* | 8/2013 | Reul ...................... H01R 13/56 439/495 |
| 2014/0138425 | A1 | 5/2014 | Meyer et al. |
| 2015/0236438 | A1* | 8/2015 | Rateiczak ............. H01R 13/02 439/884 |

FOREIGN PATENT DOCUMENTS

| | | |
|---|---|---|
| DE | 19829151 C1 | 2/2000 |
| EP | 0430889 A2 | 6/1991 |
| EP | 0612119 A1 | 8/1994 |
| EP | 0852280 A1 | 7/1998 |
| EP | 2359973 A2 | 8/2011 |
| WO | 2013/104507 A1 | 7/2013 |

OTHER PUBLICATIONS

International Search Report for PCT/EP2015/068998. dated Nov. 11, 2015. 4 pages.
Written Opinion for International Application No. PCT/EP2015/068998 filed Aug. 19, 2015 on behalf of Saint-Gobain Glass France. dated Nov. 11, 2015. 9 pages (English Translation+ German Original).

* cited by examiner

METHOD FOR PRODUCING A DISK WITH AN ELECTRICALLY CONDUCTIVE COATING AND A METAL STRIP WHICH IS SOLDERED ONTO THE DISK; AND CORRESPONDING DISK

CROSS REFERENCE TO RELATED APPLICATIONS

The present application is the U.S. national stage entry of International Patent Application No. PCT/EP2015/068998, filed internationally on Aug. 19, 2015, which, in turn, claims priority to European Patent Application No. 14187874.4, filed on Oct. 7, 2014.

The invention relates to a method for producing a pane with an electrically conductive coating and a metallic strip soldered thereon, a pane producible by the method, and use thereof.

Panes with electrically conductive coatings that are electrically contacted are known. Typically, the electrically conductive coating is implemented as printed-on silver paste in strip form that functions as a so-called current collecting rail or busbar. The current collecting rail serves, for example, to apply an electrical voltage to a conductive thin film applied on the pane, in order to generate a current flow as uniform as possible. The conductive thin film is, for example, a heatable coating or a flat electrode.

Examples of such panes are heatable motor vehicle windows, in particular windshields, thin-film solar modules, or glazings with electrically switchable optical properties, such as, for example, electrochromic glazings. The pane is typically laminated to another pane via a thermoplastic intermediate layer to form a composite glass, wherein the electrically conductive coating is arranged in the interior of the composite. The electrical contacting of the conductive coating—i.e., its connection to an external voltage source—is customarily done by means of a metallic strip, for example, a so-called "flat-band conductor" or "foil conductor", which is soldered onto the conductive coating and runs beyond the side edge of the composite glass. Outside the composite glass, the metallic strip can be connected to the connection cables to the voltage source.

The method of ultrasonic soldering (US soldering) is known for producing the connection between an electrically conductive coating and a metallic strip. Ultrasonic oscillations are transferred to the metallic strip via a soldering tip. By means of the ultrasonic oscillations, improved adhesion between the soldering compound and the surfaces is achieved, which certainly leads to a certain mechanical connection. This is, however, frequently not sufficiently stable for the practical use of the pane. Consequently, US soldering is, in the prior art, frequently only a preparatory step, in which, in particular, oxides are removed from the surface of the soldering compound by the ultrasonic oscillations. The actual soldering is done subsequently using other soldering methods by means of which the soldering compound is melted. Thus, US soldering enables, in particular, the use of flux-free soldering compounds. US soldering is disclosed, for example, in DE19829151C1, DE4432402A1, DE4032192A1, and EP2359973A2.

Whereas the prior art US soldering results in good soldering results, the need for two different soldering steps increases the time required for the production of the pane, a situation which is undesirable for industrial mass production due to the higher cycle times.

The object of the present invention is, consequently, to provide an improved method for producing a pane with an electrically conductive coating and a metallic strip soldered thereon. In particular, the solder connection between a conductive coating and a metallic strip should be done in a single ultrasonic soldering step.

The object of the present invention is accomplished according to the invention by a method for producing a pane with an electrically conductive coating and a metallic strip soldered thereon according to claim 1. Preferred embodiments emerge from the subclaims.

The method according to the invention for producing a pane with an electrically conductive coating and a metallic strip soldered thereon comprises at least the following process steps:

(a) Providing a substrate with an electrically conductive coating, (b) Providing a metallic strip with at least one through-hole, (c) Positioning the metallic strip on the electrically conductive coating, wherein the hole is arranged on the electrically conductive coating, and (d) Soldering the metallic strip to the electrically conductive coating via a soldering compound using an ultrasonic soldering tip.

The metallic strip serves in particular for the electrical contacting of the conductive coating, i.e., its connection to an external voltage source. The metallic strip, which is preferably implemented as a flat conductor, extends, starting from the conductive coating, beyond the side edge of the substrate. However, in principle, the metallic strip can also fulfill other functions, for example, increasing the electrical conductivity of the conductive coating.

In a preferred embodiment, the metallic strip is a flat conductor (preferably a strip of a metallic foil with an optional insulating sheathing), which preferably serves for connecting the conductive coating to an external electrical component (for example, a voltage source). The flat conductor beyond the side edge of the composite pane.

The metallic strip is typically implemented in the form of a strip, in particular as a strip of a metallic foil. The metallic strip includes or is made of a metal or a metal alloy and is electrically conductive. Typical metallic strips are strips of a copper foil.

The metallic strip has a bottom and a top. In the context of the invention, "bottom" designates that side of the metallic strip that is provided to be turned toward the substrate in the soldered state. Accordingly, "top" designates that side of the metallic strip that is provided to be turned away from the substrate in the soldered state.

The ultrasonic oscillations are transferred through the hole in the metallic strip according to the invention to the underlying electrically conductive coating when the ultrasonic soldering tip is moved over the metallic strip and the hole. Thus, a connection between the soldering compound and the coating is produced on the one hand, and the soldering compound and the strip on the other, by which means the coating and the strip are connected to one another via the soldering compound. Melted soldering compound can swell through the metallic strip onto the top of the strip. By means of the soldering compound on the top, the strip is, as it were, pressed against the pane (positive connection), which results in a very stable mechanical connection. These are major advantages of the present invention.

In a preferred embodiment, in process step (b), the metallic strip is prepared with the soldering compound arranged at least on the bottom. In process step (c), the bottom faces the substrate; and the soldering compound, which is arranged on the bottom, is arranged between between a metallic strip and an electrically conductive coating. The prefabricated metallic strip provided with the soldering compound is advantageous with regard to mass production. By means of the soldering compound ideally arranged between a conductive coating and a metallic strip in the vicinity of the hole before the soldering, an effective and stable solder connection is ensured. Alternatively, however, the soldering compound can also be inserted separately between a conductive coating and a metallic strip. Alternatively, the soldering compound can also be introduced from the top of the strip through the hole, for example, arranged on the soldering tip.

In a particularly preferred embodiment, soldering compound is arranged both on the bottom and on the top. This is particularly advantageous with regard to the stability of the solder connection.

The soldering compound can be arranged as a soldering compound portion near the hole. This means that the soldering compound is arranged at such a distance from the hole that melted soldering compound can reach the hole and and penetrate through it. A plurality of soldering compound portions can even be arranged on the bottom and, optionally, on the top of the strip, for example, two soldering compound portions in each case on opposite sides of the hole.

The soldering compound can alternatively be arranged as soldering compound platelets on the bottom and, optionally, on the top of the strip such that hole is covered.

The soldering compound can, alternatively, be partially pressed into the hole.

Also conceivable are other possible arrangements of the soldering compound on the metallic strip, which the person skilled in the art will select according to the requirements of the individual case.

The ultrasonic soldering according to the invention ensures a sufficiently stable mechanical connection. Preferably, the final connection is made with the ultrasonic soldering and no other subsequent soldering step with other soldering methods occurs.

In a preferred embodiment, the substrate contains glass, in particular soda lime glass. However the substrate can also contain other types of glass, for example, borosilicate glass or quartz glass. The substrate is preferably a glass pane. The substrate can also contain plastics, in particular polycarbonate or polymethylmethacrylate, and be implemented preferably as a rigid polymeric pane.

The thickness of the substrate can vary widely and thus be ideally adapted to the requirements in the individual case. Preferably, the thickness of the substrate is from 0.5 mm to 10 mm and preferably from 1 mm to 5 mm.

The substrate can be clear and colorless, but also tinted, clouded, or colored. The substrate can also be made of non-prestressed, partially prestressed, or prestressed glass.

The metallic strip is, according to the invention, soldered onto the electrically conductive coating. The electrically conductive coating is, in a preferred embodiment, a silver-containing print, in particular a screenprint, which is implemented by a printed-on and partially fired conductive paste. The conductive paste preferably contains silver particles and glass frits. The electrically conductive coating is preferably a current collecting rail (busbar).

Current collecting rails are provided to be connected to an external voltage source such that a current can flow from through a functional element arranged between the collecting rails, for example, through printed-on heating conductors running between the collecting rails or a conductive thin-film system arranged between the collecting rails. The collecting rails ensure a uniform current flow.

In a preferred embodiment, the substrate is provided with a electrically conductive thin-film system on which the electrically conductive coating is applied as a current collecting rail. The thin-film system can, for example, be a heatable coating or a surface electrode. The thin-film system can comprise one or a plurality of thin films. The expressions "a thin film" or "thin-film" usually means a film with a thickness less than or equal to 1 µm. The electrically conductive thin-film system comprises at least one electrically conductive layer, for example, containing silver or an electrically conductive oxide (transparent conductive oxide, TOO) such as indium tin oxide (ITO). The thin-film system can, additionally, have dielectric layers that serve, for example, for regulation of the layer resistance, for corrosion protection, or for reflection reduction. Typical dielectric layers contain oxides or nitrides, for example, silicon nitride, silicon oxide, aluminum nitride, aluminum oxide, zinc oxide, or titanium oxide. The thin-film system be applied on the substrate by methods known per se to the person skilled in the art, for example, physical vapor deposition (PVD), vapor deposition, magnetic field enhanced cathodic sputtering, chemical vapor deposition (CVD), plasma enhanced chemical vapor deposition (PECVD), or by wet chemical methods.

The thin-film system preferably has a smaller area than the substrate such that a peripheral edge region with a width of preferably 0.5 mm to 10 mm is not provided with the thin-film system. The thin-film system is thus protected against contact with the surrounding atmosphere when the substrate is laminated to another pane to form a composite glass.

However, it is, in principle, also possible to contact such an electrically conductive thin-film system directly, in other words, without an additional current collecting rail. For this, the metallic strip is soldered directly onto the thin-film system. In this case, the thin-film system is the electrically conductive coating in the context of the invention.

The metallic strip preferably has a thickness of 10 µm to 500 µm, particularly preferably of 30 µm to 200 µm, for example, 50 µm or 100 µm. The metallic strip is preferably implemented as a strip of a metallic foil. Conductive foils with these thicknesses are technically simple to realize and have an advantageous current carrying capacity. The length and the width of the metallic strip can vary widely and be adapted to the requirements of the individual case. Typical widths are from 2 mm to 20 mm.

The metallic strip contains at least a metal or a metal alloy. The metallic strip preferably contains aluminum, copper, tinned or silvered copper, gold, silver, zinc, tungsten, and/or tin or alloys thereof, particularly preferably copper or silver. The metallic strip can be provided with a coating, for example, to increase conductivity and as corrosion protection. The metallic strip is, in a preferred embodiment, a tinned or silvered copper strip.

A plurality of metallic strips can also be soldered onto the electrically conductive coating. The metallic strip or plurality of metallic strips can be provided pre-assembled as so-called "flat-band conductors" or "foil conductors" with an electrically insulating, polymeric sheathing. The sheathing contains, for example, polyimide, polyethylene naphthalate (PEN), or polyester and has, for example, a thickness of 25 µm to 100 µm.

A region of the metallic strip surrounding the hole on the top and on the bottom is preferably not covered by the polymeric sheathing. For this, the polymeric sheathing has, on each side, a recess that leaves the regions of the strip free as open areas. The area of the regions not covered by the sheathing is preferably from 3 mm² to 130 mm². Thus, a solder surface, on which the soldering compound can be arranged before the soldering and on which the soldering compound can stably connect to the metallic strip, is provided on the bottom. On the top, the soldering tip can be brought directly into contact with the metallic strip through the recess in the sheathing and can be moved over the strip. The transfer of the ultrasonic oscillations is thus particularly effective.

The hole in the metallic strip is a continuous hole or through-hole, i.e., an opening that extends from the top all the way to the bottom of the metallic strip. The hole can, in principle, have any shape, for example, circular or elliptical. The metallic strip can also have more than one hole, for example, two holes aligned near one another. The size of the hole should be at least 1 mm in at least one dimension.

In a preferred embodiment, the hole is implemented in the form of a slit. The term "slit" means a pronouncedly elongated shape of the hole, the length being at least 3 times the width. The slit preferably has a length of 1 mm to 20 mm, particularly preferably of 2 mm to 10 mm.

The size of the hole is advantageously adapted to the diameter of the soldering tip used. Preferably, the size of the hole is greater in at least one dimension than the diameter of the soldering tip. If the hole is implemented in the form of a slit, at least the length of the slit should be greater than the diameter of the soldering tip, for example, roughly twice as large. Thus, good soldering results are obtained. The width of the slit can even be smaller than the diameter of the soldering tip, for example, roughly half as large.

The hole can be produced in the metallic strip by any method, for example, by mechanical cutting or by laser cutting.

The ultrasonic soldering (US soldering) is performed with a suitable ultrasonic soldering tool, preferably an ultrasonic soldering tip. The soldering tip transfers the ultrasonic oscillations to the metallic strip and the soldering compound as well as to the electrically conductive coating. For this, the soldering tip is brought into contact with the top of the metallic strip. During the soldering, the soldering tip is preferably moved over the metallic strip, in particular over the hole and the surrounding region of the strip. The movement of the soldering tip can be done manually or automated, for example, with a robot arm. The movement of the soldering tip results in an effective transfer of the ultrasonic oscillations along the entire soldering area and, hence, in a particularly stable solder connection.

The frequency of the ultrasonic oscillations is preferably from 10 kHz to 100 kHz, for example, roughly 40 kHz.

The soldering compound is heated during the soldering preferably preferably to a temperature above its melting temperature such that the soldering compound melts. This is done preferably using a heatable soldering tip by which the metal strip is heated in the soldering region. The heat is transferred by the metallic strip to the underlying soldering compound, which then melts. The melting temperature depends on the soldering compound used. The heating is also dependent on the heat absorption of the metallic strip. Typical temperatures to which the metallic strip or the soldering compound are heated are from 120° C. to 450° C., preferably 180° C. to 320° C.

Soldering compounds suitable for US soldering (US soldering compounds) are familiar to the person skilled in the art and are commercially available, for example, from the company MBR ELECTRONICS GmbH under the brand name CERASOLZER. During US soldering, oxides are removed from the surface of the soldering compound by the ultrasonic oscillations, as a result of which the use of a flux is superfluous. Consequently, the soldering compound preferably contains no flux.

The soldering compound portion arranged on the bottom of the metallic strip before soldering preferably has a thickness from 50 µm to 150 µm. The total amount of the soldering compound depends on the circumstances of the individual case and can be appropriately selected by the person skilled in the art. Soldering compound amounts for typical applications are in the range from 0.1 mm³ to 20 mm³.

In an advantageous embodiment, the metallic strip is provided with an adhesive on the bottom. By means of the adhesive, the metallic strip can be fixed on the electrically conductive coating before soldering. This simplifies the precise positioning of the metallic strip. The adhesive is preferably an adhesive tape, particularly preferably a double-sided adhesive tape. The thickness of the adhesive is preferably from 20 µm to 500 µm, particularly preferably from 25 µm to 100 µm. Thus, particularly good results are obtained.

In a preferred embodiment, the adhesive completely surrounds (in the plane of the adhesive) the hole and the soldering compound arranged on the bottom of the metallic strip. If the metallic strip is arranged on the electrically conductive coating for soldering, a cavity is formed by the metallic strip, the electrically conductive coating, the adhesive, and, optionally, the insulating sheathing. For one thing, the cavity prevents uncontrolled outflow of molten soldering compound during the soldering operation, by which means a better soldering connection is obtained. For another, the cavity prevents oxides and other impurities which are released from the soldering compound or the surfaces to be soldered by the ultrasonic oscillations from being uncontrolledly distributed over the substrate. If the substrate is provided with a current-carrying coating, this can result in malfunctions. Instead, the oxides and impurities are retained in the cavity.

Typically, after the soldering of the metallic strip, the pane according to the invention is bonded to another pane to form a composite pane. For this, the pane according to the invention, at least one thermoplastic film, and another pane are arranged congruently one over another in this order and laminated to one another using known methods, for example, autoclave methods, vacuum bag methods, vacuum ring methods, calender methods, vacuum laminators, or combinations thereof. The bonding of the panes is customarily done under the action of heat, vacuum, and/or pressure. The electrically conductive coating with the soldered-on metallic strip is arranged on the surface of the substrate facing the thermoplastic film.

Here, the metallic strip is preferably a flat conductor (preferably a strip of a metallic foil with an optional insulating sheathing), which preferably serves for the connection of the conductive coating to an external electrical component (for example, a voltage source). For this purpose, the flat conductor extends, starting from the conductive coating, beyond the side edge of the substrate and beyond the side edge of the composite pane.

The electrically conductive coating is preferably applied on the substrate by screenprinting.

The invention further includes a pane obtainable with the method according to the invention.

The pane according to the invention with an electrically conductive coating and a metallic strip soldered thereon comprises at least:

a substrate with an electrically conductive coating, a metallic strip with a bottom facing the substrate and a top facing away from the substrate, which strip is mounted by means of a soldering compound on the electrically conductive coating, wherein the metallic strip is provided with a through-hole and wherein the soldering compound is arranged on a region of the bottom surrounding the hole, within the hole, and on a region surrounding the hole on the top.

In a particularly preferred embodiment, an adhesive, in particular double-sided adhesive tape, is arranged between the substrate and the metallic strip, which adhesive surrounds the portion of the soldering compound arranged on the bottom of strip and the hole. In the plane of the adhesive, the hole and the portion of the soldering compound arranged on the bottom of the metallic strip are preferably completely surrounded by the adhesive.

In a particularly advantageous embodiment, an electrically conductive thin-film system is applied on the substrate. An electrically conductive coating which forms two current collection rails for the introduction of electrical energy into the thin-film system and which contains a printed-on electrically conductive paste, in particular silver-containing paste, is applied on the thin-film system. The thickness of the current collection rails is preferably from 5 μm to 50 μm. A metallic strip is soldered according to the invention onto each current collecting rail. The metallic strip is preferably a flat conductor, in particular a strip of a metallic foil, which serves for the connection of the conductive coating/current collection rails to an external voltage source.

The pane according to the invention is provided in particular to be laminated to another pane to form a composite pane.

The composite pane comprises at least the pane according to the invention with an electrically conductive coating and a metallic strip soldered thereon, another pane, and a thermoplastic intermediate layer, which bonds the pane according to the invention and the other pane to one another. The electrically conductive coating and the soldered-on metallic strip are arranged on the surface of the substrate that faces the thermoplastic intermediate layer. The electrically conductive coating—as well as any other coatings present—are thus advantageously protected, in the interior of the laminate, against corrosion and damage. The metallic strip is preferably a flat conductor for the electrical contacting of the conductive coating with an external electrical component (for example, a voltage source) and, for this, extends, starting from the conductive coating, beyond the side edge of the composite pane.

The thermoplastic intermediate layer is preferably implemented by at least one thermoplastic film. The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic intermediate layer is preferably from 0.2 mm to 2 mm, particularly preferably from 0.3 mm to 1 mm, for example, 0.38 mm or 0.76 mm.

The composite pane is, for example,
a heatable composite pane, in particular a heatable windshield,
a glazing with electrically switchable optical properties, for example, an electrochromic glazing, an SPD glazing (suspended particle device), or a PDLC glazing (polymer dispersed liquid crystal), or
a thin-film solar module.

Other elements can be arranged between the panes, in particular when the conductive coating functions as a surface electrode or current collecting rail of a surface electrode, for example, a photovoltaic layer system or a layer system with electrically switchable optical properties (for example, an electrochromic layer system, PLDC or SPD layer system).

The invention further includes the use of a pane according to the invention in heatable windowpanes or glazings with electrically switchable optical properties.

In the following, the invention is explained in detail with reference to drawings and exemplary embodiments. The drawings are a schematic representation and are not to scale. The drawings in no way restrict the invention.

Figure 2:
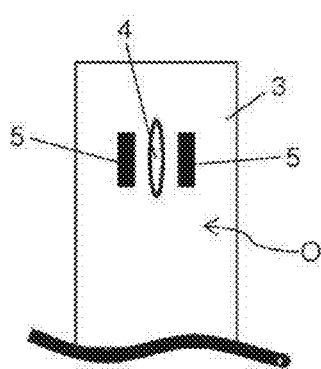
Figure 3:
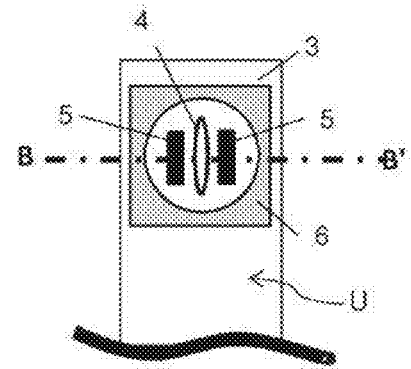
Figure 4:
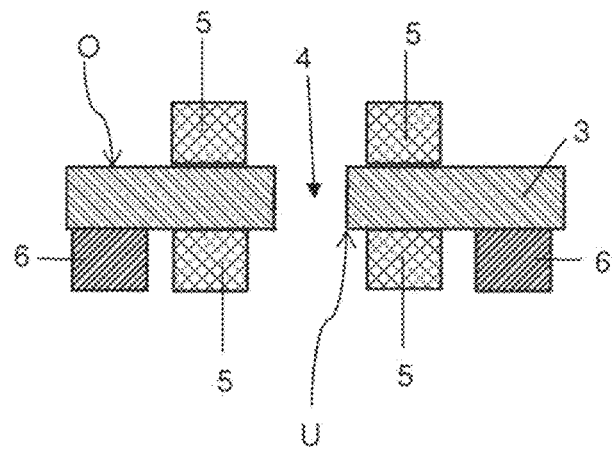
Figure 5:
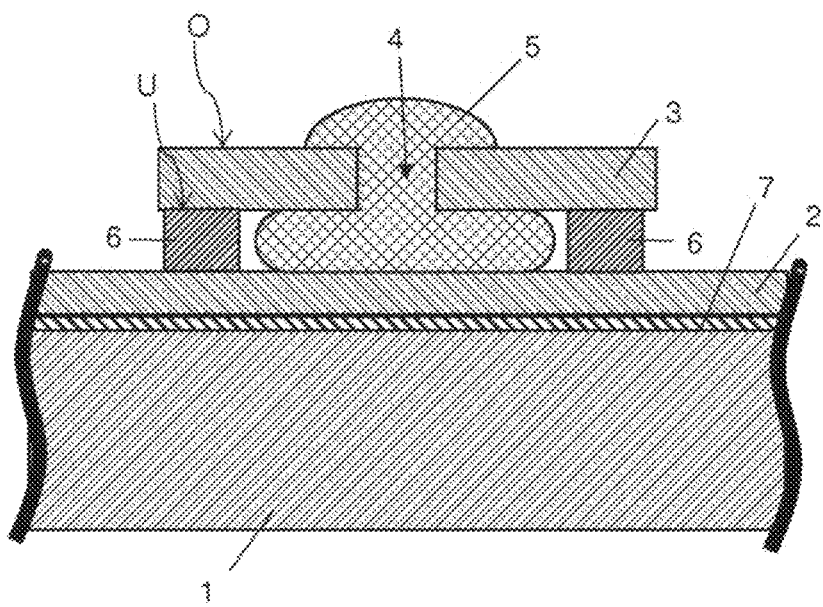
Figure 6:
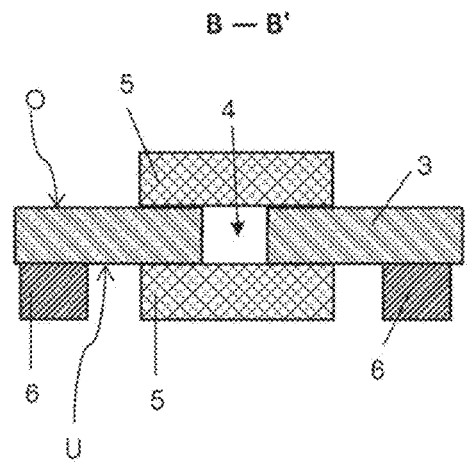
Figure 7:
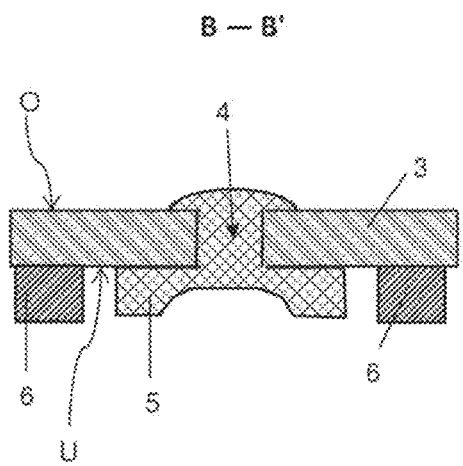
Figure 8:
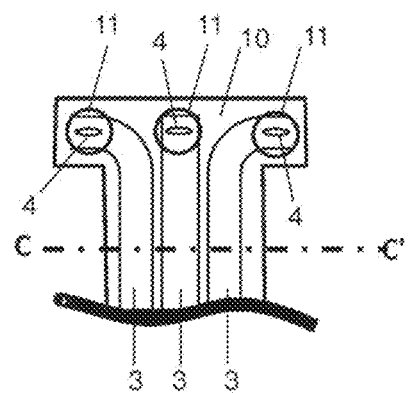
Figure 9:
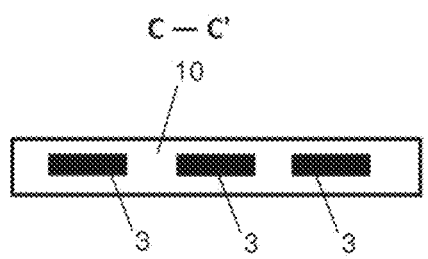
Figure 10:
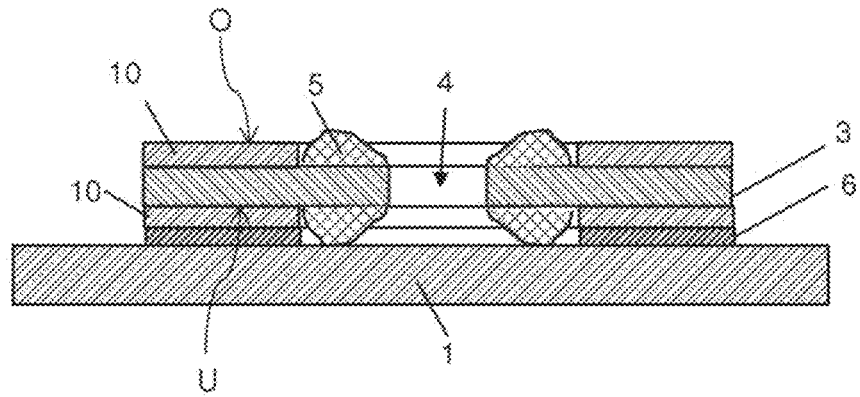
Figure 11:
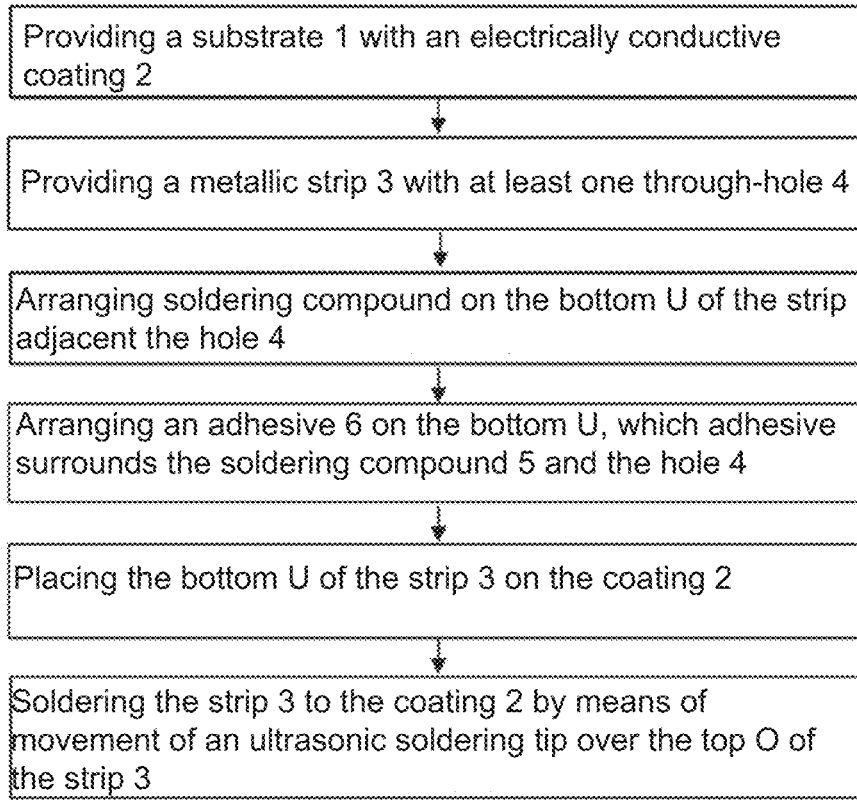

They depict:

FIG. 1 a plan view of an embodiment of the pane according to the invention,

FIG. 2 a plan view of the top O of embodiment according to the invention of the metallic strip before soldering, FIG. 3 a plan view of the bottom U of the metallic strip of FIG. 2, FIG. 4 a section along B-B' through the metallic strip of FIGS. 2 and 3, FIG. 5 a section along A-A' through the pane of FIG. 1 in the region of the soldered-on metallic strip 3, FIG. 6 a section along B-B' through another embodiment of the metallic strip, FIG. 7 a section along B-B' through another embodiment of the metallic strip, FIG. 8 a plan view of a foil conductor with a metallic strip, FIG. 9 a section along C-C' through the foil conductor of FIG. 6, FIG. 10 a section through another embodiment of the metallic strip, FIG. 11 a flowchart of an embodiment of the method according to the invention.

FIG. 1 and FIG. 5 depict in each case a detail of an embodiment of the pane according to the invention. The pane comprises a substrate 1, which is, for example, a 2.1-mm-thick glass pane made of soda lime glass. One surface of the substrate 1 is provided with an electrically conductive thin-film system 7. The thin-film system 7 contains, for example, at least one electrically conductive layer based on indium tin oxide (ITO) and is provided as a surface electrode of an electrochromic glazing. A peripheral edge region of the substrate 1 is not provided with the thin-film system 7. For the intended use, the thin-film system 7 must be connected to an external voltage source such that the switching state of the electrochromic glazing can be varied by means of the voltage applied. For this, an electrically conductive coating 2 is applied on the thin-film system 7. The coating 2 forms two current collecting rails along two opposite side edges of the substrate 1. The coating 2 is a printed-on and fired screenprinting paste containing silver particles and glass frits. For the connection of the current collecting rails to the external voltage source, a metallic strip 3 is soldered onto each current collecting rail. The metallic strip 3 is a strip of a copper foil with a thickness of 50 μm and runs from the coating 2 beyond the side edge of the pane.

The metallic strip 3 is soldered onto the coating 2 using ultrasonic soldering (US soldering). The metallic strip 3 has a hole 4, which runs through from its top O to its bottom U. Here, the top O is the surface of the strip facing away from the substrate 1: the bottom U, the surface of the strip facing the substrate 1. A flux free soldering compound 5 suitable for US soldering durably stably connects the strip 3 to the coating 2. The soldering compound 5 is arranged between the bottom U of the strip 3 facing the substrate 1 and the coating 2, and, to be sure, on a region of the bottom U surrounding the hole 4. The soldering compound is further arranged within the hole 4 as well as on a region on the top O of the strip 3 surrounding the hole 4. By means of this "mushroom-shaped" arrangement of the soldering compound 5, a particularly stable soldered connection is obtained. A suitable soldering compound 5 is, for example, flux-free In97Ag3.

An adhesive 6, namely a double-sided adhesive tape, is applied on the bottom U of the strip 3. The adhesive tape completely surrounds the hole 4 and the soldering compound 5. The adhesive 6, the strip 3, and the substrate 1 with the coating 2 form a cavity that is opened only by the hole 4.

FIG. 2, FIG. 3, and FIG. 4 depict in each case a detail of a suitable metallic strip 3 before soldering. The strip 3 has a slit-shaped hole 4 with a length of 6 mm and a width of 1.5 mm. This size of the hole is ideally suited for soldering with a soldering tip with a diameter of 3 mm. A double-sided adhesive tape that surrounds the hole 4 is applied on the bottom U as adhesive 6. Adjacent the hole 4 and within the region surrounded by the adhesive 6, two depots of a soldering compound 5 with the layer thickness of 100 μm are also applied on the bottom U. The layer thickness of the soldering compound 5 preferably corresponds to the thickness of the adhesive 6. If the metallic strip is additionally provided with polymeric sheathing, the layer thickness of the soldering compound 5 preferably corresponds to the sum of the thickness of the adhesive 6 and the thickness of the sheathing. Two more soldering compound portions 5 are applied oppositely on the top O.

The arrangement of the soldering compound 5 both on the top O and on the bottom U is advantageous with regard to the formation of a "mushroom-shaped" soldering compound after the soldering operation as depicted in FIG. 5.

For soldering, the strip 3 is placed on the the electrically conductive coating 2 such that the bottom U faces the substrate 1 and the coating 2. During US soldering, a soldering tip is brought into contact with the top O and moved over the region to be soldered. The movement is done over the the hole 4 as well. Oxides and impurities are removed from the soldering compound 5 by the ultrasonic oscillations. They are not allowed to be distributed uncontrolledly over the substrate 1; but, instead, are retained in the cavity formed by the adhesive 6, the strip 3, and the coating 2. This is advantageous with regard to the quality of the coating 2 and, in particular, of the thin-film system 7, which would be negatively affected by distributed impurities. The soldering compound is also bonded to the surfaces of the strip 3 and of the coating 2 by the ultrasonic oscillations such that a mechanical bond is produced. When the soldering compound 5 is melted by increasing the temperature, the adhesive 6 also prevents uncontrolled outflow of the soldering compound 5. Instead, excess soldering compound 5 swells through the hole 4 of the strip 3 and thus forms the positive-fitting, "mushroom-shaped" soldering compound arrangement, as in FIG. 5. The solder connection can be produced in a single US soldering step; conventional touch-up soldering unnecessary. These are major advantages of the present invention.

FIG. 5 depicts a cross-section through the pane of FIG. 1 with the substrate 1, the thin-film system 7, the conductive coating 2, the metallic strip 3 with the hole 4, and the adhesive 6 as well as the "mushroom-shaped" arranged soldering compound 5.

FIG. 6 depicts a cross-section through another embodiment of the metallic strip 3 according to the invention with the adhesive 6 and the soldering compound 5 before soldering. In contrast to the embodiment of FIG. 4, the soldering compound portions are arranged not near the hole 4, but as soldering compound platelets such that they cover the hole 4. One soldering compound platelet is arranged in each case on the bottom U and on the top O of the strip 3. This arrangement as well favors the formation of the "mushroom-shaped" soldering compound 5 of FIG. 5 after the soldering operation.

FIG. 7 depicts a cross-section through another embodiment of the metallic strip 3 according to the invention with the adhesive 6 and the soldering compound 5 before soldering. The soldering compound 5 is pressed into the hole 4 and protrudes both over the top O and over the bottom U. This arrangement as well favors the formation of the "mushroom-shaped" soldering compound 5 of FIG. 5 after the soldering operation. By means of the pressing-in of the soldering compound 5, for example, using pliers, a very stable connection between the strip 3 and the soldering compound 5 is ensured.

FIG. 8 and FIG. 9 depict in each case a detail of a pre-assembled flat-band conductor. The flat-band conductor contains three metallic strips 3 that are implemented as strips of a copper foil in an insulating sheathing 10 made of plastic. The sheathing 10 is made, for example, of polyimide and has, for example, a thickness of 50 μm. Each strip 3 is provided with a slit-shaped hole 4. The sheathing 10 has, on both sides, i.e., on the top and the bottom in each case a circular recess 11 in the region of each hole 4. The recess 11 on the bottom serves for the soldered connection of the strip 3; the recess 11 on the top, for the contacting with the soldering tip during soldering. An adhesive 6 is preferably arranged on the sheathing 10 and surrounds the recess 11, FIG. 10 depicts a cross-section through another embodiment of the metallic strip 3 with the hole 4 before soldering. The metallic strip 3 has a polymeric sheathing 10 with a thickness of 50 μm, which is removed in the region around the hole 4. There, the soldering compound 5 is applied on the bottom U and on the top O near the hole. The polymeric sheathing 10 on the bottom U is glued on the substrate 1 using an adhesive 6 with a thickness of 50 μm. The thickness of the soldering compound 5 is 100 μm, i.e., the sum of the thicknesses of the adhesive 6 and the sheathing 10. For the sake of clarity, the electrically conductive coating on the substrate 1 is not shown.

FIG. 11 depicts a flowchart of an exemplary embodiment of the method according to the invention for producing a pane according to the invention. A suitable frequency of the ultrasonic oscillations during soldering is, for example, 40 kHz. During soldering, the soldering compound 5 is preferably heated to a temperature of, for example, 315° C. and melted.

LIST OF REFERENCE CHARACTERS (1) substrate
(2) electrically conductive coating
(3) metallic strip
(4) hole in the metallic strip 3
(5) soldering compound
(6) adhesive
(7) electrically conductive thin-film system
(10) insulating sheathing of 3
(11) recess in 10
O top of the metallic strip 3
U bottom of the metallic strip 3
A-A' section line B-B' section line
C-C' section line

The invention claimed is:

1. A method for producing a pane with an electrically conductive coating and a metallic strip soldered thereon, comprising:
   (a) providing a substrate with an electrically conductive coating,
   (b) providing a metallic strip with at least one through hole,
   (c) positioning the metallic strip on the electrically conductive coating, wherein the at least one through hole is placed on the electrically conductive coating, and
   (d) soldering the metallic strip to the electrically conductive coating via a soldering compound and using an ultrasonic soldering tip,
      wherein the metallic strip is provided with an adhesive placed directly on bottom, the adhesive surrounding the at least one through hole and the soldering compound.

2. The method according to claim 1, wherein the ultrasonic soldering tip is brought into contact with a top of the metallic strip and is moved over the hole and the metallic strip surrounding the hole.

3. The method according to claim 1, wherein the soldering compound is melted by heat generated during soldering.

4. The method according to claim 1, wherein the soldering compound is provided in step (b) and the soldering compound is placed on one of i) bottom, ii) top, or iii) bottom and top of the metallic strip.

5. The method according to claim 1, wherein the adhesive is a double-sided adhesive tape.

6. The method according to claim 1, wherein the metallic strip is a flat conductor, extending from the electrically conductive coating to beyond a side edge of the substrate.

7. The method according to claim 1, wherein the hole has shape of a slit.

8. The method according to claim 1, wherein the electrically conductive coating comprises a printed-on conductive paste.

9. The method according to claim 8, wherein the conductive paste comprises silver particles and glass frits.

10. The method according to claim 1, wherein the metallic strip has a thickness of 10 µm to 500 µm.

11. The method according to claim 1, wherein the metallic strip has a thickness of 30 µm to 200 µm and comprises copper or silver.

12. The method according to claim 1, wherein the substrate comprises glass.

13. The method according to claim 12, wherein the glass is a soda lime glass.

* * * * *